United States Patent
Ma et al.

(10) Patent No.: US 7,808,192 B2
(45) Date of Patent: Oct. 5, 2010

(54) HEAT DISSIPATION SYSTEM

(75) Inventors: Wen-Chuan Ma, Taoyuan Hsien (TW); Nien-Hao Hsu, Taoyuan Hsien (TW); Wen-Shi Huang, Taoyuan Hsien (TW)

(73) Assignee: Delta Electronics, Inc., Taoyuan Hsien, Taiwan (CN)

( * ) Notice: Subject to any disclaimer, the term of this patent is extended or adjusted under 35 U.S.C. 154(b) by 1088 days.

(21) Appl. No.: 11/391,545

(22) Filed: Mar. 29, 2006

(65) Prior Publication Data
US 2006/0273826 A1 Dec. 7, 2006

(30) Foreign Application Priority Data
Jun. 2, 2005 (TW) .............................. 94118153 A

(51) Int. Cl.
*H02P 1/00* (2006.01)
(52) U.S. Cl. ............................ 318/268; 318/34; 318/66; 318/471; 388/903; 388/934
(58) Field of Classification Search .................. 318/268, 318/461, 471–473, 599, 799, 811, 813, 34, 318/49, 59, 66, 68, 93, 94, 95, 111, 112, 318/113; 361/687, 695
See application file for complete search history.

(56) References Cited

U.S. PATENT DOCUMENTS

| 4,135,235 | A | * | 1/1979 | Baker | 363/43 |
| 4,167,775 | A | * | 9/1979 | Baker et al. | 363/42 |
| 4,223,261 | A | * | 9/1980 | White | 318/721 |
| 5,239,251 | A | * | 8/1993 | Lauw | 318/767 |
| 5,598,314 | A | * | 1/1997 | Hall | 361/93.7 |
| 6,428,282 | B1 | * | 8/2002 | Langley | 417/2 |
| 6,545,438 | B1 | * | 4/2003 | Mays, II | 318/400.01 |
| 6,737,860 | B2 | * | 5/2004 | Hsu et al. | 324/161 |
| 6,987,370 | B2 | * | 1/2006 | Chheda et al. | 318/400.08 |
| 7,190,142 | B2 | * | 3/2007 | Ha | 318/599 |
| 2006/0181232 | A1 | * | 8/2006 | Oljaca et al. | 318/268 |

* cited by examiner

*Primary Examiner*—Bentsu Ro
*Assistant Examiner*—Thai Dinh
(74) *Attorney, Agent, or Firm*—BIrch, Stewart, Kolasch & Birch, LLP

(57) ABSTRACT

A heat dissipation system includes at least one fan, at least two controllers, a signal generator, and a signal converter. The controllers are electrically connected to the fan and generate an enable signal according to a feedback signal of the fan. The signal generator is electrically connected to the controllers and generates a control signal according to the enable signal. The signal converter is electrically connected to the signal generator and the fan, converts the control signal to a drive signal to the fan, thereby controlling rotation speed of the fan.

6 Claims, 5 Drawing Sheets

HEAT DISSIPATION SYSTEM

This Non-provisional application claims priority under U.S.C. §119(a) on Patent Application No(s). 094118153 filed in Taiwan, Republic of China on Jun. 2, 2005, the entire contents of which are hereby incorporated by reference.

BACKGROUND

The invention relates in general to a heat dissipation system, and in particular to a heat dissipation system with enhanced reliability.

As device technology trends toward more compact size and complex circuitry, higher power density is required for an excellent heat dissipation system.

FIG. 1 is a block diagram of a conventional heat dissipation system 1, including a power supply 10, a controller 11 and several fans 12. The fans 12 are electrically connected to the power supply 10 and the controller 11. The power supply 10 supplies power to fans 12, and the controller 11 controls the rotation speed of fans 12 by inputting a control signal S6.

However, it is usually only one power supply or controller disposed in the conventional heat dissipation system 1 so that the conventional heat dissipation system 1 becomes unreliable. When one of the key components (such as the power supply 10 or the controller 11) fails, the entire system operation is shut down. For example, failure of the controller 11 results in uncontrolled rotation speed of the fans 12, failure of the power supply 10 causes the system 1 to shut down. Therefore, there is a need for a heat dissipation system capable of adequately preventing failure.

SUMMARY

The invention provides a heat dissipation system including at least a fan, at least two controllers, a signal generator, and a signal converter. The controllers are electrically connected to the fan and generate an enable signal according to a feedback signal from the fan. The signal generator is electrically connected to the controllers and generates a control signal according to the enable signal. The signal converter is electrically connected to the signal generator and the fan and converts the control signal to a drive signal to the fan, thereby controlling the rotation speed of the fan.

In some embodiments, a heat dissipation system includes at least a fan, a controller, at least two signal generators and a signal converter. The controller is electrically connected to the fan and generates an enable signal according to a feedback signal from the fan. The signal generators are electrically connected to the controllers and generate a control signal according to the enable signal. The signal converter is electrically connected to the signal generators and the fan and converts the control signal to a drive signal to the fan, thereby controlling the rotation speed of the fan.

In some embodiments, a heat dissipation system includes at least a fan, a controller, a signal generator and at least two signal converters. The controller is electrically connected to the fan and generates an enable signal according to a feedback signal from the fan. The signal generator is electrically connected to the controllers and generates a control signal according to the enable signal. The signal converters are electrically connected to the signal generators and the fan and convert the control signal to a drive signal to the fan, thereby controlling the rotation speed of the fan.

BRIEF DESCRIPTION OF THE DRAWINGS

The invention will become more fully understood from the detailed description, given hereinbelow, and the accompanying drawings. The drawings and description are provided for purposes of illustration only and, thus, are not intended to be limiting of the present invention.

DETAILED DESCRIPTION

Figure 1:
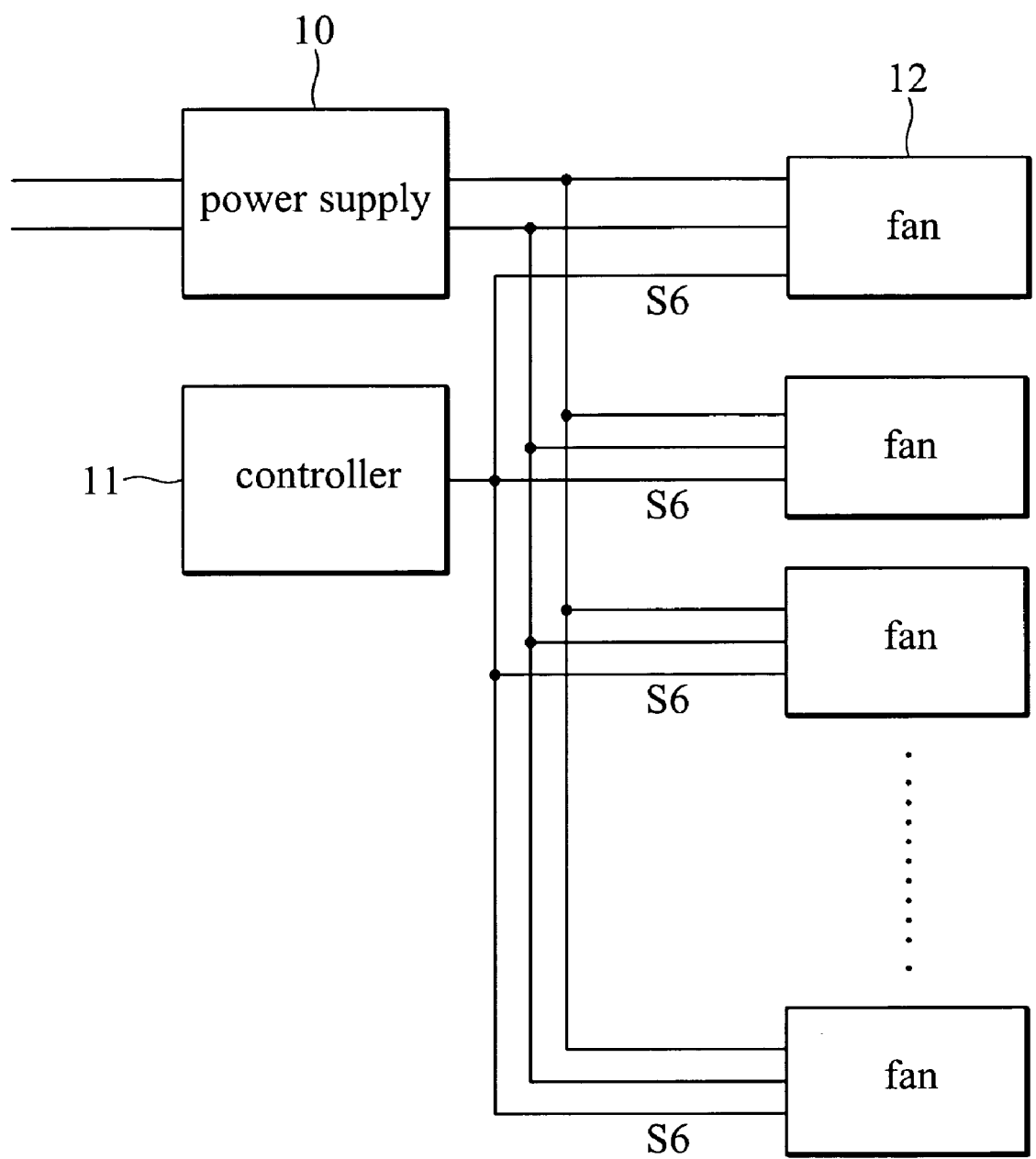
FIG. 1 is a block diagram of a conventional heat dissipation system 1.
Figure 2:
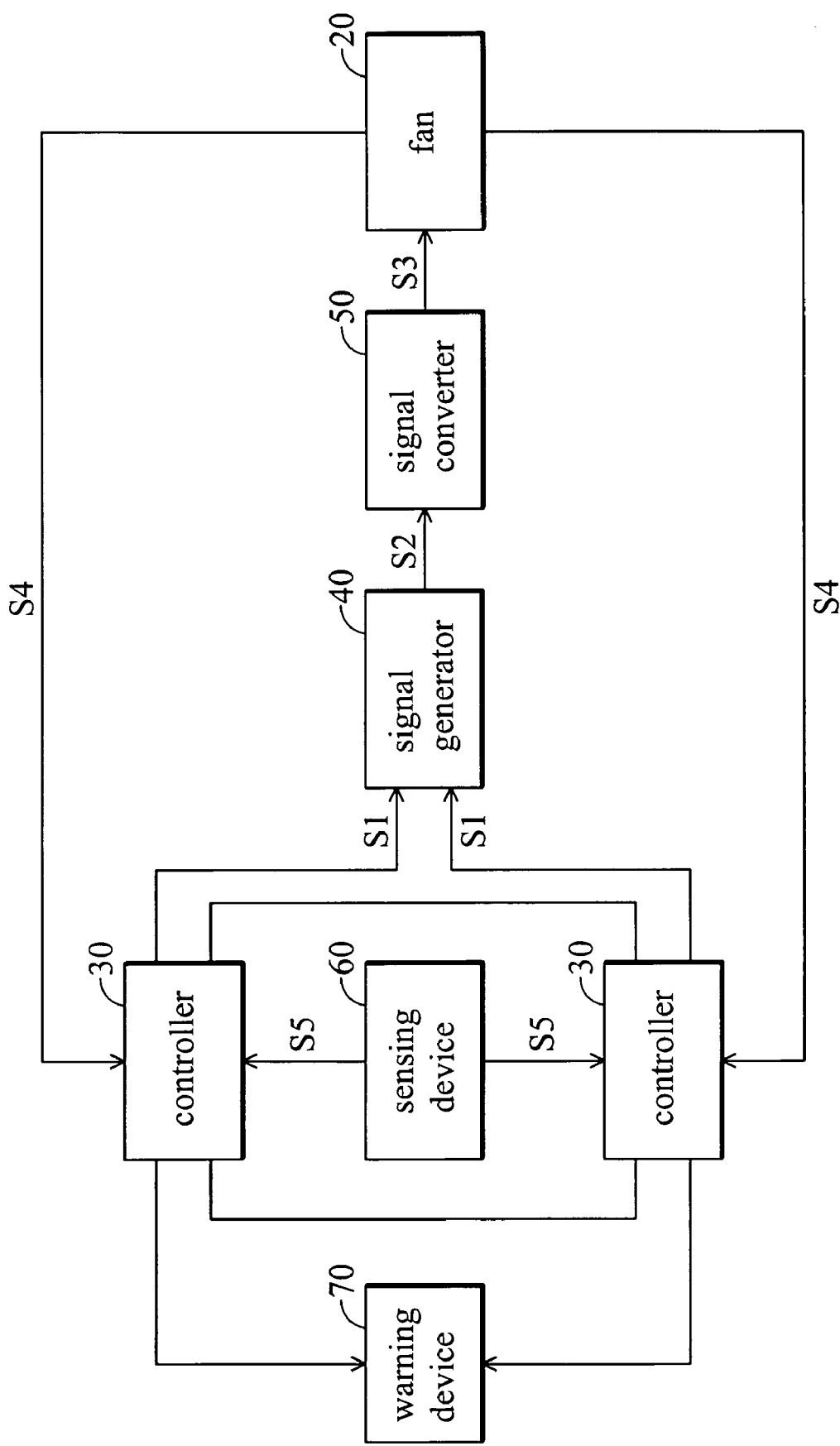
FIG. 2 is a block diagram of a heat dissipation system 2 according to a first embodiment of the invention.

FIG. 2 is a block diagram of a heat dissipation system 2 according to a first embodiment of the invention. The heat dissipation system 2 includes a fan 20, at least two controllers 30, a signal generator 40, a signal converter 50, a sensing device 60, and a warning device 70.

In FIG. 2, two controllers 30 are connected in parallel and electrically connected to the fan 20. Two controllers 30 receive a feedback signal S4 from the fan 20 to generate an enable signal S1. The controllers 30 may be microprocessors, microcontrollers, digital signal processors, or equivalent devices.

The signal generator 40 is electrically connected to the controllers 30 and receives an enable signal S1 to generate a control signal S2, which is preferably a pulse width modulation (PWM) signal.

The signal converter 50 is electrically connected to the signal generator 40 and the fan 20, and converts the control signal S2 to a drive signal S3 to the fan 20 and adjusts the rotation speed of the fan 20 so that fan 20 may provide a feedback signal S4 to the controllers 30. The drive signal S3 may be a voltage signal.

Because there are two controllers 30 provided in the embodiment, one of the controllers 30 may serve as a backup for the other in the event that one breaks down. As the results, the enable signal S1 can still be delivered to the signal generator 40 so as to keep the heat dissipation system 2 in normal operation. Further, if both of the controllers 30 fail and output no enable signal S1, the signal converter 40 automatically generates a constant control signal S2 to the signal converter 50, and thus the fan 20 can be kept to be running. The constant control signal S2 may be generated through a software, hardware, or a combination of both.

In addition, the controllers 30 can be electrically connected to a sensing device 60 and a warning device 70. The Sensing device 60 detects ambient temperature to provide a detection signal S5 to the controllers 30, which subsequently generates an enable signal S2 in accordance with the feedback signal S4 and the detection signal S5.

When an abnormal feedback signal S4 is received by the controllers 30, the warning device 70 generates a warning signal (not shown), such that users can be given a notification to the abnormal condition and solve the problem of fan 20 instantly. The warning signal may be a light or a sound, provided by such as a light emitting diode (LED) or a buzzer.

Also, it is noted that a plurality of fans 20 may be utilized in the heat dissipation system 2, and all fans 20 are electrically connected to the controllers 30 such that if some fans 20 are broken down, the remaining fans 20 can operate normally even.

Figure 3:
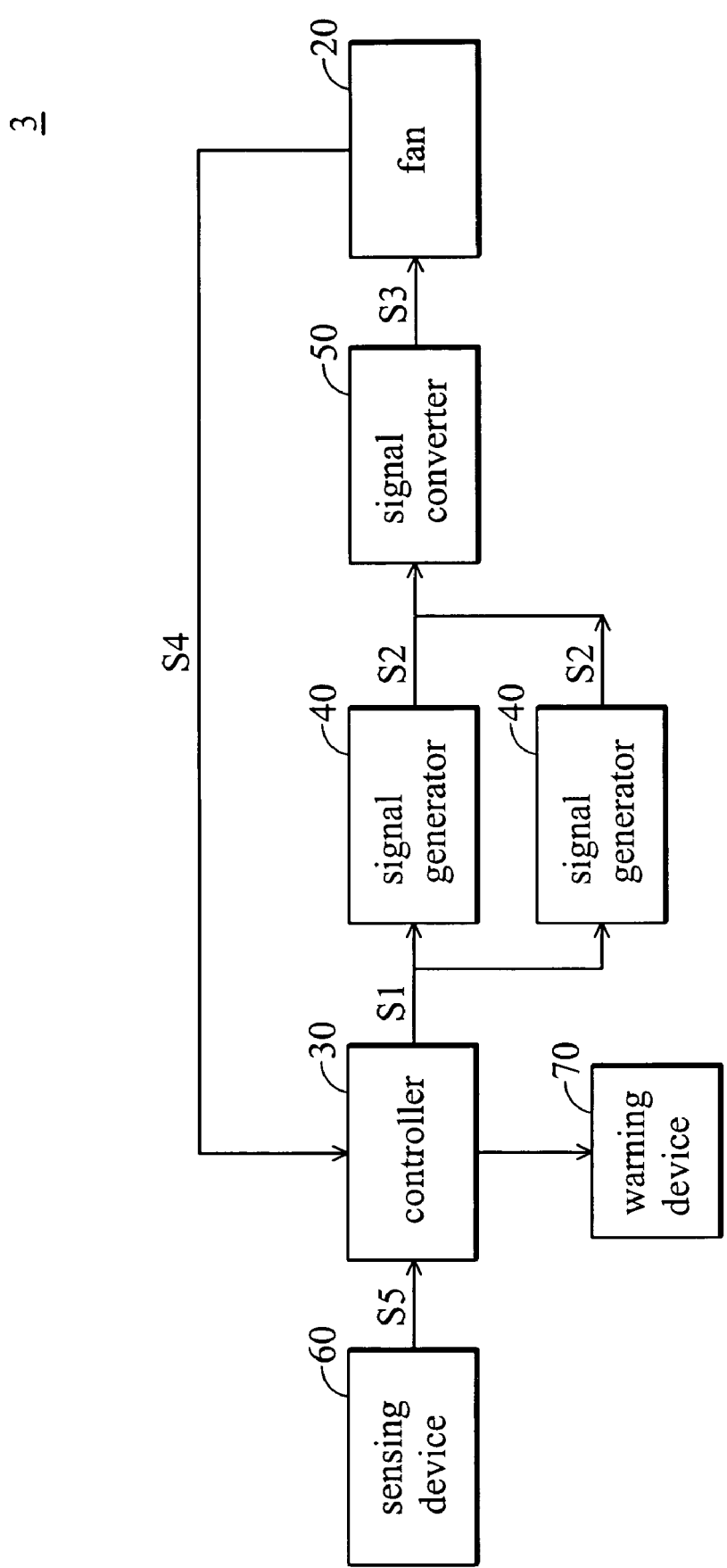
FIG. 3 is a block diagram of a heat dissipation system 3 according to a second embodiment of the invention.

FIG. 3 is a block diagram of a second embodiment of a heat dissipation system 3, which includes the fan 20, the controller 30, at least two signal generators 40, the signal converter 50, the sensing device 60, and the warning device 70 as FIG. 2. In FIG. 3, the controller 30 is electrically connected to two signal generators 40, the signal converter 50, and the fan 20. The controller 30 is further electrically connected to the sensing device 60 and the warning device 70, as shown in FIG. 2.

In this embodiment, the controller 30 generates an enable signal S1 according to the feedback signal S4 from the fan 20, and the signal generators 40 generate a control signal S2 according to the enable signal S1. The signal converter 50 converts the control signal S2 to a drive signal S3 so as to drive the fan 20.

It is noted that the two signal generators 40 are provided in this embodiment such that one of the signal generators 40 can serve as a backup of the other in the event that one breaks down. As the results, the control signal S2 can still be delivered to the signal converter 50 to keep the heat dissipation system 3 in normal operation. Therefore, the system reliability of the heat dissipation system 3 is enhanced.

Figure 4:
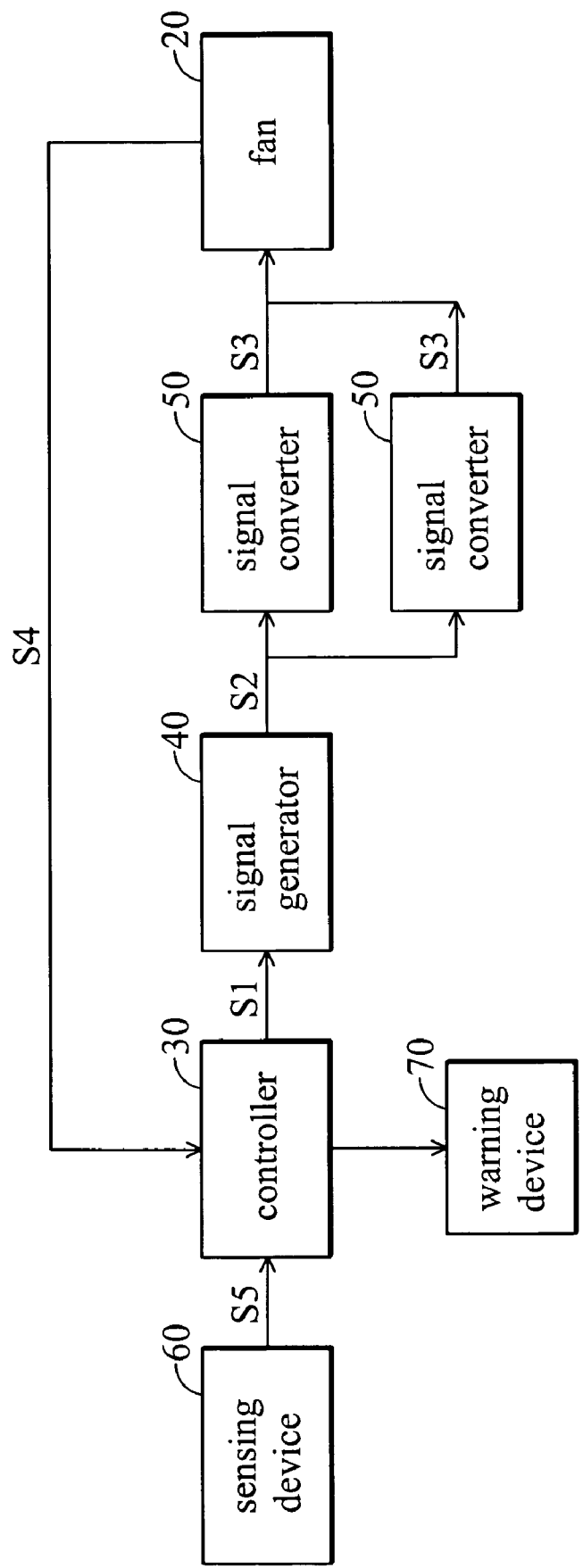
FIG. 4 is a block diagram of a heat dissipation system 4 according to a third embodiment of the invention.

FIG. 4 is a block diagram of a heat dissipation system 4 according to a third embodiment of the invention, which includes the fan 20, the controller 30, the signal generator 40, at least two signal converters 50, the sensing device 60, and the warning device 70 as FIG. 2. In FIG. 4, the controller 30 is electrically connected to the signal generator 40, two signal converters 50, and the fan 20.

In the embodiment, the controller 30 generates an enable signal S1 according to a feedback signal S4 from the fan 20, and subsequently the signal generator 40 generates a control signal S2 according to the enable signal S1. The signal converters 50 convert the control signal S2 to a drive signal S3 to drive the fan 20.

Because there are two signal converters 50 provided in the embodiment, one of the signal converters 50 serve as a backup of the other in the event that one breaks down. As the results, the drive signal S3 can still be delivered to the signal converter 50 so as to keep the heat dissipation system 4 in normal operation. Therefore, the system reliability of the heat dissipation system 4 is enhanced.

Figure 5:
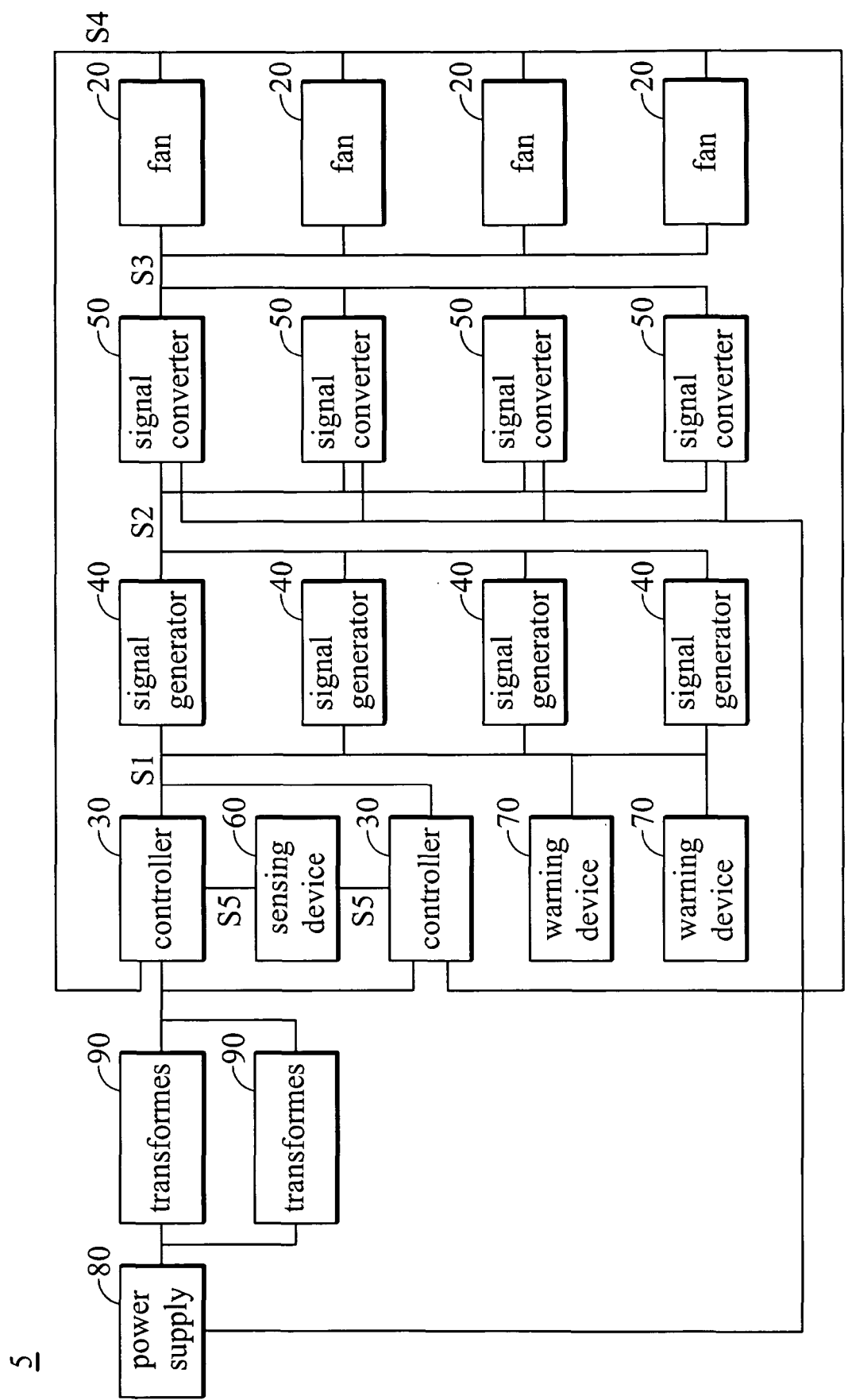
FIG. 5 is a block diagram of a heat dissipation system 5 according to a fourth embodiment of the invention.

FIG. 5 is a block diagram of another heat dissipation system 5, which includes four fans 20, two controllers 30, four signal generators 40, four signal converters 50, the sensing device 60, two warning devices 70, the power supply 80, and two transformers 90. In FIG. 5, the power supply 80 is electrically connected to two transformers 90, two controllers 30, four signal generators 40, four signal converters 50, and four fans 20. The power supply 80 is also electrically connected to four signal-converters 50.

Two transformers 90 transform a large voltage from the power supply 80 to a small voltage to two controllers 30. The sensing device 60 is electrically connected to the controllers 30 and two warning devices 70. The sensing device 60 may be a thermal sensitive resistor and the warning devices 70 are such as LEDs.

Because the heat dissipation systems of the present invention are equipped with multiple transformers, controllers, signal generators, signal converters, fans, or warning devices, any breakdown of a particular device can still find a backup device to keep the entire heat dissipation system in normal operation. As the results, the reliability of the heat dissipation system is enhanced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat dissipation system, comprising:
   at least one fan;
   a controller electrically connected to the fan and generating an enable signal according to a feedback signal from the fan;
   at least two signal generators electrically connected to the controller and generating a control signal according to the enable signal;
   a signal converter electrically connected to the signal generators and the fan and converting the control signal to a drive signal to the fan, thereby controlling rotation speed of the fan; and
   a warning device electrically connected to the controller, wherein the warning device generates a warning signal if the feedback signal is abnormal, and the controller speeds up another fan when the feedback signal from one fan is abnormal.

2. The heat dissipation system of claim 1, wherein the control signal is a pulse width modulation (PWM) signal.

3. The heat dissipation system of claim 1, wherein the signal generators are connected in parallel.

4. The heat dissipation system of claim 1, further comprising a sensing device electrically connected to the controller, wherein the sensing device detects ambient temperature of the fan and generates a detection signal, and the controller generates the enable signal according to the feedback signal and the detection signal.

5. The heat dissipation system of claim 4, wherein the sensing device is a thermal sensitive resistor.

6. The heat dissipation system of claim 1, wherein the signal converter is further electrically connected to a power supply and a transformer which transforms a voltage of the power supply and outputs the voltage to the controller.

* * * * *

UNITED STATES PATENT AND TRADEMARK OFFICE
CERTIFICATE OF CORRECTION

| | | |
|---|---|---|
| PATENT NO. | : 7,808,192 B2 | Page 1 of 1 |
| APPLICATION NO. | : 11/391545 | |
| DATED | : October 5, 2010 | |
| INVENTOR(S) | : Wen-Chuan Ma et al. | |

It is certified that error appears in the above-identified patent and that said Letters Patent is hereby corrected as shown below:

ON THE TITLE PAGE:

At item (73), Assignee, change

"Delta Electronics, Inc., Taoyuan Hsien (CN)"

to

-- Delta Electronics, Inc., Taoyuan Hsien (TW) --.

Signed and Sealed this
Eighteenth Day of January, 2011

David J. Kappos
*Director of the United States Patent and Trademark Office*